United States Patent [19]

Wright et al.

[11] 4,133,930

[45] Jan. 9, 1979

[54] LIGHTWEIGHT STRUCTURAL PANEL

[75] Inventors: John T. Wright, Cattaraugus; Kevin A. Wolfe, Otto, both of N.Y.

[73] Assignee: Champion International Corporation, Stamford, Conn.

[21] Appl. No.: 852,383

[22] Filed: Nov. 17, 1977

[51] Int. Cl.² ................................................ B32B 5/18
[52] U.S. Cl. .................................. 428/315; 428/321; 428/322
[58] Field of Search ............... 428/315, 320, 322, 321

[56] References Cited

U.S. PATENT DOCUMENTS

| | | | |
|---|---|---|---|
| 3,531,367 | 9/1970 | Karsten | 428/315 |
| 3,832,263 | 8/1974 | Cleveland et al. | 428/315 |
| 3,936,565 | 2/1976 | Good | 428/315 |
| 3,954,537 | 5/1976 | Alfter et al. | 428/315 |
| 4,008,347 | 2/1977 | Amberg et al. | 428/315 |
| 4,013,810 | 3/1977 | Long | 428/315 |
| 4,020,207 | 4/1977 | Alfter et al. | 296/117 A |
| 4,034,131 | 7/1977 | Rhoads | 428/35 |
| 4,049,147 | 9/1977 | Stiles et al. | 428/315 |

*Primary Examiner*—James J. Bell
*Attorney, Agent, or Firm*—Evelyn M. Sommer

[57] ABSTRACT

A lightweight structural panel comprises a foam core member. Adhered to one face of the core member is a pigmented plastic cover sheet having substantially the same plan configuration as the core member. The plastic sheet contains a mix of additives, antioxidants, and pigment coatings which prevent it from cracking, splitting and getting hard. In addition, the cover sheet has substantially the same response to changes in temperature and humidity as the core member such that the panel retains its original shape despite changes in temperature and humidity. In another embodiment both faces of the core member include a plastic cover sheet adhered thereto.

11 Claims, 2 Drawing Figures

LIGHTWEIGHT STRUCTURAL PANEL

BACKGROUND OF THE INVENTION

The subject invention relates to lightweight structural panels, and specifically, to lightweight panels suitable for outdoor use. It is desirable in the construction industry to have structural panels which while being lightweight and relatively inexpensive to manufacture, are also durable and suitable for outdoor use. For example, it is desirable to provide lightweight structural panels which may be used by homeowners to build additional rooms onto a house. It will be appreciated that panels which are lightweight, relatively inexpensive, and have high insulation qualities would have great appeal for such use. Other desirable uses for the lightweight panels of the subject invention would be as a house siding or roof material. Unfortunately, known lightweight panels are not suitable for outdoor use. They tend to become deformed, and crack, split, or harden when exposed to sun and weather forces.

Accordingly, it is an object of the subject invention to provide a structural panel which while being lightweight and relatively inexpensive to manufacture is also durable and suitable for outdoor use.

It is a further object of the subject invention to provide a structural panel having the above characteristics which also has high insulation quality.

SUMMARY OF THE INVENTION

In accordance with the subject invention, a lightweight structural panel includes a central stryene foam core member. Adhered to both faces of the core member is a plastic cover sheet, each cover sheet having substantially the same plan configuration as the core member. Preferably the plastic sheets are a pigmented polyethylene, which include a mixture of additives, antioxidants and pigment coatings for protecting the plastic from the forces of weather. The plastic cover sheets and the foam core member all have substantially the same response to changes in temperatuere and humidity such that the resulting panel will remain in its original form even after constant exposure to weather forces.

In an alternate embodiment the structural panel comprises a styrene foam core member having adhered to only one face thereof a pigmented polyethylene cover sheet. This alternate embodiment of the subject invention is particularly useful as a skirt for a mobile home where the back side of the panel need not be laminated.

DESCRIPTION OF THE PREFERRED EMBODIMENTS

Figure 1:
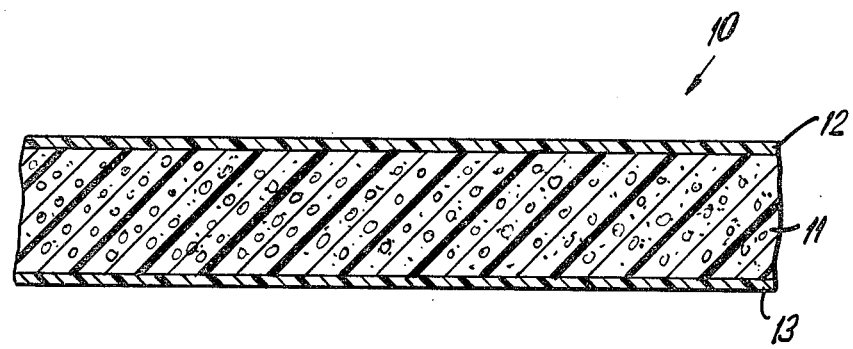
FIG. 1 is a cross-sectional view of the structural panel of the subject invention.

Referring to FIG. 1, the structural panel 10 of the subject invention is a multilayered laminate. Specifically, the panel 10 comprises three layers, namely a central core member 11 which preferably constitutes the bulk of the panel and a pair of cover sheets 12 and 13, each sheet being adhered to one face of the core. Preferably, the core member 11 is made from a foam material such as styrene which is relatively inexpensive and lightweight and is not subject to deterioration if protected from sunlight. In addition, the styrene foam core provides the resulting panel 10 with a high degree of insulation. The cover sheets 12 and 13 each have substantially the same plan configuration as the core member, and may be structurally bonded to each face thereof by any known means. Preferably, sheets 12 and 13 are made from a pigmented polyethylene which contains a mix of additives and antioxidants and special coated pigments that make the polyethylene suitable for outdoor use. This prevents the polyethylene from cracking, splitting or hardening when exposed to sun and weather forces. In addition, it is preferable that the polyethylene sheets 12 and 13 have similar responses to changes in temperature and humidity as the styrene foam core member 13. As a result, the panel 10 retains its original shape despite constant exposure to sun and weather forces.

The panel 10 illustrated in FIG. 1 may be typically used for building additional rooms onto existing houses. Generally, such panels are two feet by eight feet, or longer, and approximately one inch thick. Because the panels are lightweight, the rooms may be easily shipped from place to place in unassembled form. The panels 10 are also quite useful as house siding and roof material.

Figure 2:
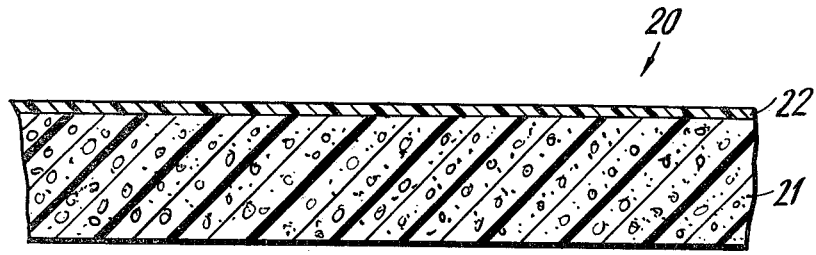
FIG. 2 is a cross-sectional view of an alternate embodiment of the structural panel of the subject invention.

Referring to FIG. 2, an alternate embodiment of the subject invention is illustrated. Panel 20 is a two layered laminate which includes a core member 21 and a plastic cover sheet 22 which is structurally bonded to one face of the core. The core 21 constitutes the bulk of the panel, and is preferably a foam material such as styrene which makes panel 20 lightweight and provides the panel with a high degree of insulation. The cover sheet 22, which has substantially the same plan configuration as the core, is preferably a pigmented polyethylene. As described above with respect to the panel 10 of FIG. 1, it is preferable that polyethylene sheet 22 of panel 20 contain a mix of additives and antioxidants and special coated pigments which make the polyethylene suitable for outdoor use. In addition, it is preferable that cover sheet 22 have substantially the same response to changes in temperature and humidity as core member 21 such that the panel 20 will retain its original shape despite constant exposure to sun and weather forces. The subject panel 20 may typically be used as a skirt member for a mobile home.

As indicated above, the polyethylene sheets 12 and 13, and 22 of panels 10 and 20 respectively, contain a special mix of additives, antioxidants and special coated pigments which provide the sheets with a long useful life for outdoor use. Preferably this mixture includes additives such as fillers for instance phenolic wood flours and light inhibitors such as benzotriazole, antioxidants such as sterically hindered phenols and amines and special coated pigments such as silica coated $TiO_2$. The face or cover sheet can be prepared by the conventional plastic compounding techniques.

A formulation particularly suitable for use in fabricating the face or cover sheet comprises the following:

- 100 parts by weight low melt index, high density polyethylene resin, for instance LB830 manufactured by U.S.I. Chemical.
- 2.0–2.4 parts silica coated $TiO_2$ pigments, for instance Dupont R960, iron oxide or other metallic pigments for colors.
- 0.1 parts substituted benzotriazole, for instance Ciba, Tinuvin 327 as disclosed in U.S. Pat. Nos. 3,004,096 and 3,189,616.

0.1 parts sterically hindered amines for instance Ciba, Tinuvin 770 disclosed in U.S. Pat. No. 3,640,928.

0.2 parts sterically hindered phenol, for instance Ciba, Irginox 1076 as disclosed in U.S. Pat. Nos. 3,285,855 and 3,330,859 or a trifunctional phenol such as Goodrite 3114.

up to 10% phenolic wood flour fillers as for example disclosed in U.S. Pat. No. 3,988,270 and manufactured by Johnson Flour Mills.

While the preferred embodiments of the subject invention has been described and illustrated, it would be obvious that various changes and modifications can be made therein without departing from the spirit of the invention which should be limited only by the scope of the appended claims.

What is claimed is:

1. A multilayered lightweight structural panel comprising a foam core member and a first plastic cover sheet adhered to one surface of said core member, said first plastic sheet having substantially the same plan configuration as said core member, said first plastic sheet having substantially the same response to changes in temperature and humidity as said core member, said first plastic cover sheet further containing a mixture of phenolic wood flour fillers, light inhibitors, sterically hindered phenols, trifunctional phenols, sterically hindered amines and metallic pigments for rendering said panel substantially weatherproof.

2. A multilayered lightweight structural panel as recited in claim 1 in which the plastic is a pigmented polyethylene.

3. A multilayered lightweight structural panel as recited in claim 1 in which the core member constitutes the bulk of the panel.

4. A multilayered lightweight structural panel as recited in claim 1 in which the core member is a styrene foam.

5. A multilayered lightweight structural panel as recited in claim 2 in which the polyethylene contains at least one member of the group consisting of additives, antioxidants and coated pigments.

6. A multilayered lightweight structural panel as recited in claim 1 in which a second plastic cover sheet is adhered to the other surface of said core member, said plastic sheet having substantially the same configuration as said first cover sheet, said second cover sheet having substantially the same response to changes in temperature and humidity as said first cover sheet and said core member.

7. A multilayered lightweight structural panel as recited in claim 6 in which said second cover sheet is pigmented polyethylene.

8. A multilayered lightweight structural panel as recited in claim 6 in which said second cover sheet contains at least one member selected from the group of additives, antioxidants, and coated pigments.

9. A three layered lightweight structural panel comprising a central styrene foam core member; first and second pigmented polyethylene cover sheets, each of said cover sheets having substantially the same plan configuration as said core member, each of said cover sheets being structurally bonded to one of the faces of said core member, said cover sheets and said core member having substantially the same response to changes in temperature and humidity such that the panel retains its shape despite constant exposure to changes in temperature and humidity, said cover sheets further containing a mixture of phenolic wood flour fillers, light inhibitors, sterically hindered phenols, trifunctional phenols, sterically hindered amines and metallic pigments for rendering said panel substantially weatherproof.

10. A multilayered lightweight structural panel according to claim 1, said first plastic cover sheet further containing up to 10% by weight of wood flour fillers selected from the group consisting of rice hull flour, cherry pit flour, pecan shell flour and walnut shell flour; about 0.1 parts by weight light inhibitors selected from the group consisting of substituted benzotriazole; about 0.2 parts by weight of a sterically hindered phenol or a trifunctional phenol; about 0.1 parts by weight of sterically hindered amines; and about 2.0 to about 2.4 parts by weight of metallic pigments.

11. A three layered lightweight structural panel according to claim 9, said cover sheets further containing up to 10% by weight of wood flour fillers selected from the group consisting of rice hull flour, cherry pit flour, pecan shell flour and walnut shell flour; about 0.1 parts by weight light inhibitors selected from the group consisting of substituted benzotriazole; about 0.2 parts by weight of a sterically hindered phenol or a trifunctional phenol; about 0.1 parts by weight of sterically hindered amines; and about 2.0 to about 2.4 parts by weight of a metallic pigments.

* * * * *